June 17, 1969     C. MASSA     3,450,233
DEFORMABLE SHOCK ABSORBER
Filed May 11, 1967
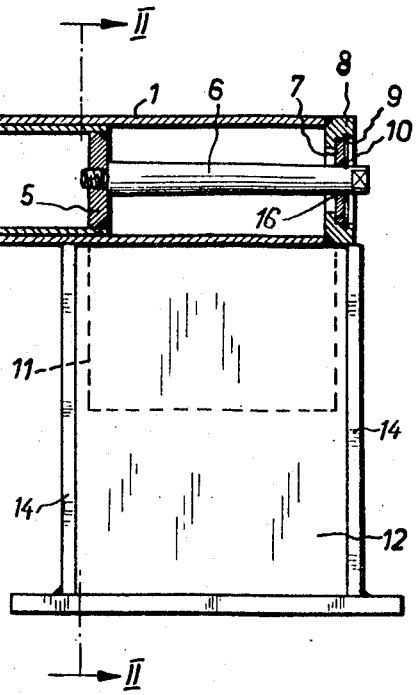
Fig. 1
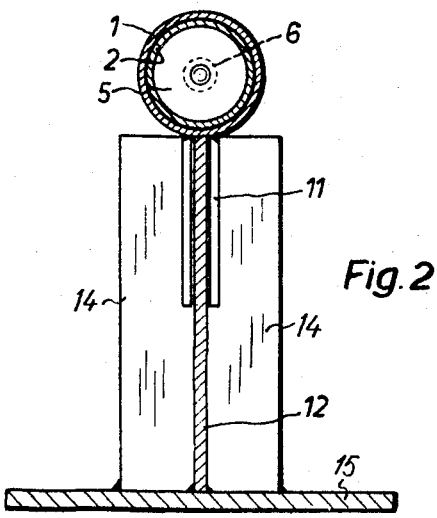
Fig. 2
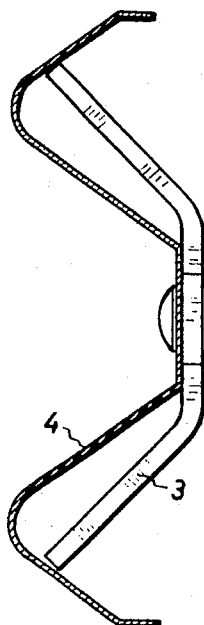
INVENTOR.
Cesar Massa
BY
ATTYS.

United States Patent Office
3,450,233
Patented June 17, 1969

3,450,233
DEFORMABLE SHOCK ABSORBER
Cesar Massa, Klingnau, Switzerland, assignor to Aktiengesellschaft Conrad Zschokke, Stadtgasse, Dottingen, Aargau, Switzerland
Filed May 11, 1967, Ser. No. 637,680
Claims priority, application Switzerland, May 13, 1966, 6,994/66
Int. Cl. F16d *63/00*; B60r *19/00, 21/14*
U.S. Cl. 188—1                    7 Claims

ABSTRACT OF THE DISCLOSURE

This invention relates to shock absorber of the type comprising a damping member which is permanently deformed by the action of a shock, so that the energy of impact acting on the shock absorber is consumed by the permanent deformation of a structural part of the shock absorber.

---

Shock absorbers are destined to intercept energy of impact, and in order to accomplish this purpose they either may comprise a spring element which retracts the members of a shock absorber to their original positions after having been operated by a shock, or they may use a damping member which may undergo a permanent deformation when subjected to the action of a shock, thus preventing any reversing movement and retraction of structural members into the starting or original position. The energy of impact, in this case, is consumed by the permanent deformation of a structural member of the shock absorber.

In many practical applications of a shock absorber, other than the use as a spring suspension for absorbing continuously repeated shocks, it is particularly advisable to use a shock absorber of the second mentioned type, particularly when a reversal of movement of the members actuated by impact would constitute a danger and should be avoided.

A shock absorber of the type in which the energy of impact is consumed by a permanent deformation of a structural member, can be advantageously combined with guide rails which are used along traffic highways. Such type of shock absorbers reduce the inertia of a sudden loss of speed of a vehicle having met with an accident and prevent the danger of an uncontrolled rejection of the vehicle back on the traffic lane.

The usual guide rails placed along the border of highways form a compact structural unit with the anchoring means in the ground, i.e. the guide rails are directly secured to the piles driven into the ground at spaced intervals along the highway. They fulfill their purpose to prevent a vehicle having met with an accident, or left the traffic lane, from falling into a precipice or from uncontrolled deviation onto the opposite traffic lane.

Experience has shown that often a car projected against a guide rail is thrown back on the traffic lane and constitutes a dangerous obstacle for other vehicles which notice the accident too late to avoid a collision. The material used for the guide rails is steel having a certain elasticity, and when it is impacted by a motor car, it is stressed like a string, so that a portion only of the energy of impact is consumed by deformation or demolition of the guide rail, and a substantial portion of the energy will act as rebounding force.

The object of the present invention is to prevent as far as possible the creation of a rebounding force and to provide a shock absorber with a yielding but not resilient structural member which will be deformed when subjected to a shock, owing to said member consisting of relatively soft material being forced by the impact through a member of harder material exerting a cutting or upsetting action on the softer material.

The shock absorber according to the present invention comprises a supported tubular guide member, a shock receiving ram telescoped in said guide member, a pair of cooperating braking members contacting each other within said guide member and secured respectively to said guide member and to said ram, the two braking members being made of materials of different hardness and one of the braking members having a gradually varying cross-sectional area in the direction of movement of the ram, whereby upon a shock received by said ram and displacement of the ram relatively to the guide member, said braking members are relatively moved and the energy of impact received by the ram is consumed owing to deformation of the braking member of comparatively softer material by the braking member of comparatively harder material.

A preferred use of this shock absorber is its combination with guide rails which are placed along the border of traffic highways, the ram which is telescoped in the tubular guide member having its free end projecting out of the guide member connected with a guide rail.

The pair of braking members comprises a perforated disc of comparatively hard material and an elongate rod of softer material which engages the perforation in the disc, the cross-sectional area of the rod varying over the length of the rod and increasing from the portion of the rod engaged in said perforation towards the ends of the rod secured to the ram.

The cross-sectional area of said rod can vary at a constant rate, in which case the rod is conical, so that upon the rod being forced through said perforation owing to the action of a shock on the ram, the disc either cuts or removes material from the circumference of the rod, the thickness of the cutting increasing towards the end of the rod, or the disc deforms the rod by upsetting material along its circumference. The characteristic corresponding to the consumption of energy of impact in this case is linear.

The braking members formed by the rod and by the perforated disc cutting or upsetting material from the rod upon the rod being driven through the perforation owing to the ram being subjected to an impact, preferably consist of a tapering rod of aluminum coacting with a steel disc.

A preferred embodiment of the shock absorber according to the invention is illustrated in the accompanying drawings, in which FIGURE 1 is a longitudinal section through the shock absorber, FIGURE 2 is a transverse section according to the line II—II of FIGURE 1.

A hollow cylinder formed by a length of pipe 1 serves as a guide for a further length of pipe 2 having an external diameter which corresponds to the internal diameter of pipe 1, allowance being made for a small clearance between the two contacting surfaces. A bracket 3 is welded to the outer end of the pipe 2. The guide rail 4 is secured to this bracket by means of a screw bolt 13. The inner end of the tube 2 is closed by a disc 5 fixed to the tube. A rod 6 of circular cross section, consisting of a relatively soft metal, such as aluminum, is screwed into the disc 5 and extends rearwardly along the axis of the tubular members. The diameter of the rod 6 should be made to suit the service conditions to be expected, since the rod 6 is the weakest member of the structure subjected to an impact. The diameter of the rod 6, in the represented example, is about one quarter of the length of the diameter of the pipe 1. The rod 6 is slightly tapering from its end screwed into the disc 5 until the point where it is supported in the bore of a disc 7 tightly fitting over the end portion of the rod. Thus, when the rod is axially moved through the bore of the disc owing to a shock acting against the guide rail 4, the edge 16 of the disc along the bore will effect a cutting or upsetting action on the periphery of the rod and remove a few tenths of one millimeter material around the periphery of the rod. The disc 7 provided with the tightly fitting bore is rigidly secured to an end plate 8 of the pipe 1 by means of a lock ring 9. A second lock ring 10 situated in the same transverse plane as the lock ring 9, engages the rod 6 adjacent the disc 7 and prevents an axial movement of the rod towards the left in FIGURE 1, opposite to the direction of movement for effecting a shock absorbing action. The surface of the rod 6 and/or the internal surface of the perforation in the disc 7 receiving the rod 6 can be smooth or roughened.

For anchoring the length of pipe 1 to the ground, the pipe is provided with two parallel, downwardly directed plate-shaped, spaced brackets 11 welded thereto and engaging over the central web 12 of an upright double T-iron having flanges 14 welded to a base plate 15. The flanges 14 prevent a movement of the plate-shaped brackets 11 and accordingly of the pipe 1 in longitudinal direction. The base plate 15 will be anchored in the ground. The supporting structure 12, 14, 15 allows a convenient and quick mounting of the shock-absorbing unit together with a length of guide-rail 4.

I claim:

1. A shock absorber for use with a highway guide rail, comprising a supported tubular guide member, a shock receiving ram including a first end telescoped in said guide member and a second end releasably secured to said guide rail, a pair of braking members including a disk having an aperture therein defined by an annular edge, and a tapered elongate rod having a straight conical surface the smaller end of said rod extending through the aperture with said conical surface contacting said annular edge, said braking members being releasably secured to respectively separate ones of said guide member and said ram, said rod being made of a material which is comparatively softer than the material of said disk, whereby upon the receipt of a shock by said guide rail and said ram and displacement of said ram relative to said guide member, said rod is deformed by said annular edge with a linear energy consumption of deformation.

2. A shock absorber for use with a highway guide rail according to claim 1, wherein said disk consists of steel and said rod consists of aluminum.

3. A shock absorber for use with a highway guide rail according to claim 1, and further comprising means secured to said smaller end of said rod to prevent withdrawal of said rod from said aperture.

4. A shock absorber according to claim 1, in which the braking member of softer material consists of aluminum and the braking member of harder material consists of steel.

5. A shock absorber for use with a highway guide rail according to claim 1, in which said disk is secured to said supported tubular guide member and said rod is secured to the ram.

6. A shock absorber for use with a highway guide rail according to claim 1, in which said disk is secured to the ram and said rod is secured to the tubular guide member.

7. A shock absorber for use with a highway guide rail according to claim 1, in which said tubular guide member and said ram are cylindrical.

References Cited

UNITED STATES PATENTS

| | | | |
|---|---|---|---|
| 2,682,931 | 7/1954 | Young | 188—1 |
| 2,961,204 | 11/1960 | Rayfield et al. | 188—1 X |
| 3,209,864 | 10/1965 | Boyd | 188—1 |
| 3,354,990 | 11/1967 | Stahl | 188—1 |

FOREIGN PATENTS 1,280,548   11/1961   France.

DUANE A. REGER, *Primary Examiner.*

U.S. Cl. X.R.

293—69